United States Patent
Klein et al.

(10) Patent No.: US 8,401,925 B1
(45) Date of Patent: Mar. 19, 2013

(54) MULTI-PRODUCT SOFTWARE LICENSE SELECTION

(75) Inventors: Bradley A. Klein, Fort Collins, CO (US); Toran K Kopren, Fort Collins, CO (US); Travis Page Longona, Fort Collins, CO (US); James Eugene Wade, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 492 days.

(21) Appl. No.: 12/694,181

(22) Filed: Jan. 26, 2010

(51) Int. Cl.
 *G06Q 30/00* (2006.01)
(52) U.S. Cl. .................................... 705/26.62
(58) Field of Classification Search ........... 705/26–27.2, 705/50–59
 See application file for complete search history.

(56) References Cited

U.S. PATENT DOCUMENTS

| | | | |
|---|---|---|---|
| 5,182,770 A | 1/1993 | Medveczky et al. | |
| 5,671,412 A * | 9/1997 | Christiano | 1/1 |
| 6,029,145 A | 2/2000 | Barritz et al. | |
| 6,810,389 B1 * | 10/2004 | Meyer | 705/59 |
| 6,954,930 B2 | 10/2005 | Drake et al. | |
| 7,139,737 B2 * | 11/2006 | Takahashi et al. | 705/59 |
| 7,831,457 B2 * | 11/2010 | Varadarajan et al. | 705/7.22 |
| 2003/0018964 A1 | 1/2003 | Fox et al. | |
| 2003/0163807 A1 | 8/2003 | Drake et al. | |
| 2003/0182563 A1 | 9/2003 | Liu | |
| 2004/0013177 A1 | 1/2004 | Sorrells et al. | |
| 2006/0136747 A1 | 6/2006 | Ahdout et al. | |
| 2006/0230271 A1 | 10/2006 | Milton et al. | |
| 2006/0236318 A1 | 10/2006 | Moran et al. | |

OTHER PUBLICATIONS

Samuelson, Pamela; "Legally Speaking, When is a "License" Really a Sale?" Mar. 2009, Communications of the ACM, vol. 52 No. 3, pp. 27-29.*

* cited by examiner

*Primary Examiner* — Adam Levine

(57) ABSTRACT

A computer determines desired software products for a managed system. The computer selects a first set of one or more available owned licenses, each license of said first set involving the least waste in terms of covering non-desired products. The computer selects a second set of one or more of licenses from said first set, each license of said second set providing most coverage in terms of covering desired software products. The computer applies a license of said second set to said managed system.

19 Claims, 3 Drawing Sheets

US 8,401,925 B1

MULTI-PRODUCT SOFTWARE LICENSE SELECTION

BACKGROUND

In a centrally managed computer system, different managed systems can have different management capabilities. For example, one managed system may have provisions for different power-vs.-performance settings, while another may not. For another example, one hardware system may host virtual machines, which may also be centrally managed, while another managed hardware system may not. As a result, some management products, e.g., management products specifically devoted to power management or virtual machine hosts, may be applicable to some managed systems and not to others in the same centrally managed system. In recognition of this reality, some management software vendors allow their products to be licensed for some managed systems but not on others.

For managed systems for which licenses are desired, the licensing scheme can vary among products and hardware platforms. Software products can be licensed on a per-server basis, on a per-socket (processor) basis, or on a per-core basis. In some cases, both individual product licenses and multi-product licenses may be available that apply to the same managed system.

DETAILED DESCRIPTION

Figure 1:
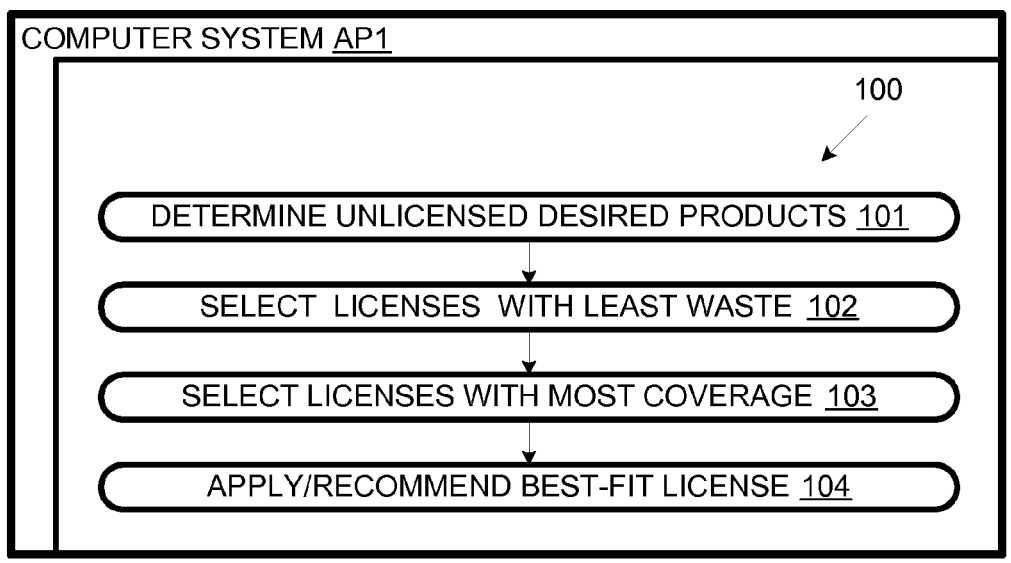
FIG. 1 is a schematic diagram of a system in accordance with an embodiment. Within the rectangle representing the system is shown a flow-chart of a process corresponding to the functionality of the system.

A system AP1, illustrated in FIG. 1, implements a process 100 designed to automate and substantially optimize the application of software product licenses to managed systems. At process segment 101, the unlicensed desired products for a managed system are determined. At process segment 102, the available owned (e.g., paid for) licenses that involve the least waste in terms of covering non-desired products are selected. From these (assuming there is more than one "least-waste" product), the ones that provide the most coverage of the desired products are selected at process segment 103. One of these "most-coverage", "least-waste " licenses is then recommended to a human user or applied at process segment 104.

If some desired products remain unlicensed, process 100 can be iterated. By considering purchasable rather than available licenses, process 100 can be applied to generate recommendations for purchasing additional licenses if the available licenses are insufficient. Also, process 100 can be applied to other managed systems. As a result, a system administrator is significantly relieved of the burden of determining what licenses are to be applied to the different managed systems.

Figure 2:
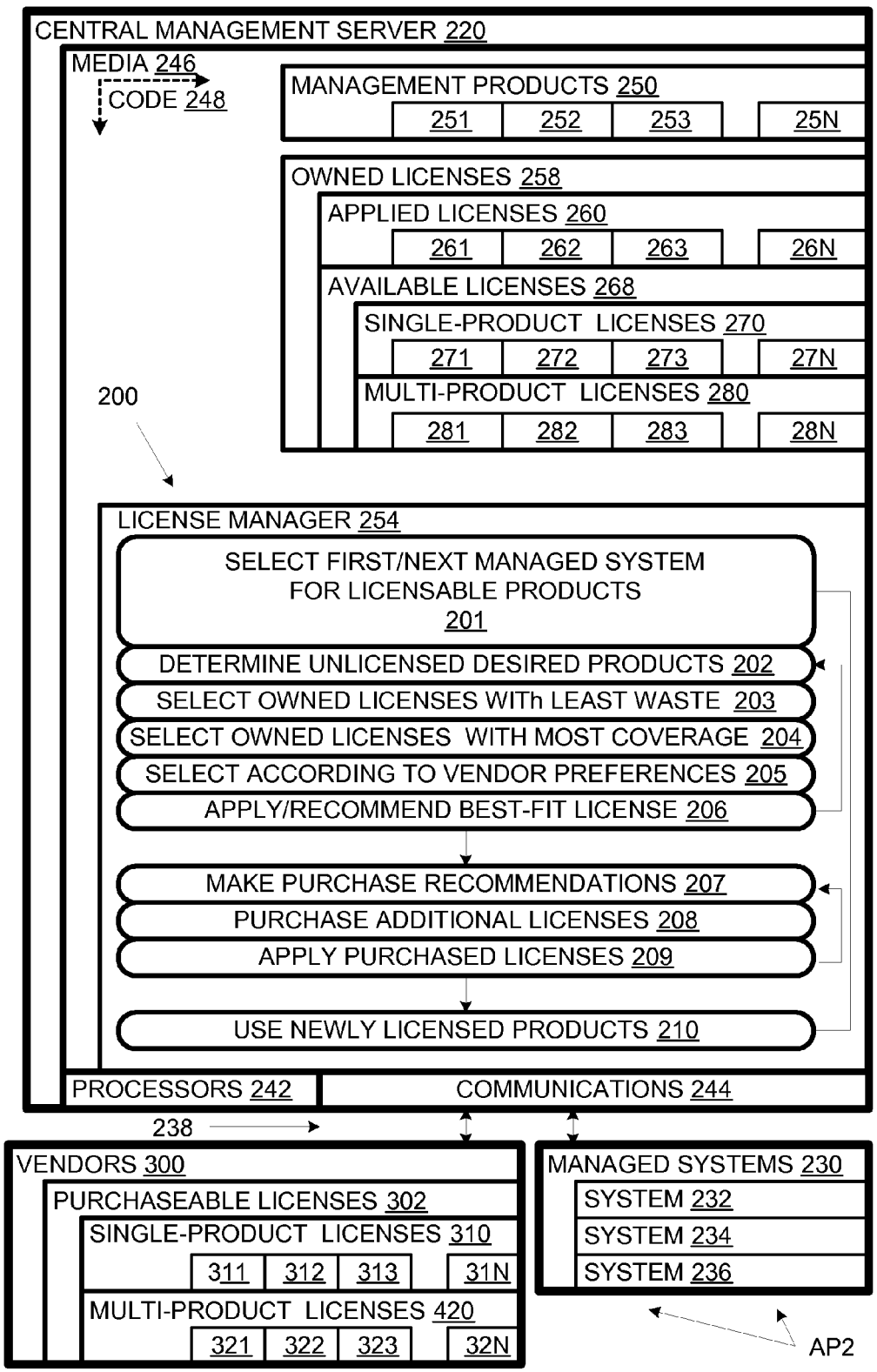
FIG. 2 is a combined schematic diagram and flow chart of a method in accordance with system and process embodiments.

In a centrally managed system AP2, a process 200 including process segments 201-210 is implemented, as shown in FIG. 2. System AP2 includes a central management server (CMS) 220 and managed systems 230, including managed systems 232, 234, and 236. Over networks 238, central management server 220 communicates with managed systems 230.

CMS 220 includes processors 242, communications devices 244, and computer-readable storage media 246. Media 246 is encoded with code 248, which includes programs executable by processors 242 and data readable and manipulable by processors 242 in accordance with the programs. The programs can include management products 250, including management products 251, 252, 253, . . . 25N, and license manager 254.

Code 248 also includes data in a license database of owned licenses 258 including applied (to managed systems) licenses 260, e.g., applied licenses 261, 262, 263, . . . 26N, and available (in that they are owned but not yet applied to any managed system) licenses 268. Available licenses 268 include single product licenses 270, e.g., licenses 271, 272, 273, . . . 27N, and multi-product licenses 280, e.g., licenses 281, 282, 283, . . . , 28N.

Centrally managed system AP2 and its administrator can communicate with vendors 300 for purchasing additional licenses 302, including various single-product licenses 310, e.g., licenses 311, 312, 313, . . . 31N, and various multi-product licenses 320, e.g., licenses 321, 322, 323, and 32N.

License manager 254 is a central management program that, when executed by processors 242, implements process 200. Process segment 201 involves selecting a managed system to which a management product is to be applied. In practice, all managed systems 230 of system AP2 may be selected, e.g., serially by virtue of iterations of process 200.

At process segment 202, a determination is made of the unlicensed desired products for the selected managed system. For example, the desire might be to apply a power management product to managed system 232, to which the management product has not been previously applied. There may be management products for which the managed system is already licensed; these are excluded from consideration during process segment 202. If there are no unlicensed desired products for the currently selected managed system, process 200 can return to process segment 201 to select a next managed system or end if there are no more managed systems to consider. Otherwise, for any given managed system, there can be one or more such desired software management products that are as yet unlicensed.

At process segment 203, least-waste applicable (in that they cover at least one desired product) licenses are selected from available licenses 268. Individual licenses for desired products inherently involve minimal waste, so these will be selected if available. In one implementation, bundle licenses that cover two or more desired products and no non-desired products are selected along with individual licenses. In an alternative implementation, bundle licenses would only be selected if there were no individual licenses available for a desired product, e.g., because bundle licenses inherently "waste" a license for the bundle itself. Next under consideration would be bundle licenses which cover one or more desired products as well as one or more non-desired products, giving preference to bundles covering the smallest number of non-desired products. In some cases, there may be no applicable license available. In that case, process 200 can skip to process segment 207.

At process segment 204, the licenses with the most coverage are selected from the least-waste available licenses. For example, a three-product bundle would be selected over a two-product bundle given that they were equal as to waste. In the implementation in which a bundle license can be considered non-waste, a non-waste bundle is selected in favor of a non-waste individual license. Among individual licenses, a license for a product to run on all cores of an 8-core system would be selected in favor a license for at most four cores. Such "fractional" considerations can apply to bundles as well.

At process segment 205, further criteria can be used to winnow selected licenses. For example, a vendor preference for permanent as opposed to temporary or "demo" licenses can be applied to further narrow the choices of licenses to be applied to the current managed system.

If, by the end of process segment 205, there is only one license remaining, it is applied at process segment 206. Otherwise, a best-fit license is arbitrarily selected to be recommended and/or applied at process segment 206. Applying a license, which involves a state transformation in media 246, in process 200 causes the applied license to terminate its status as one of available licenses 268 so that it becomes one of applied licenses 260. Concomitantly, the licensed products, product, or fraction of a product are/is no longer "desired" and are not considered during further iterations of process 200.

If at the end of an iteration of segments 202-206 there remain unlicensed desired products and applicable available licenses, another iteration of segments 202-206 is implemented. If all products have been licensed, process 200 is terminated as to the current managed system, but can be iterated for other managed systems. If at the end of an iteration of segments 202-206, there are unlicensed desired products but not applicable licenses, process 200 can continue with process segment 207.

Figure 3:
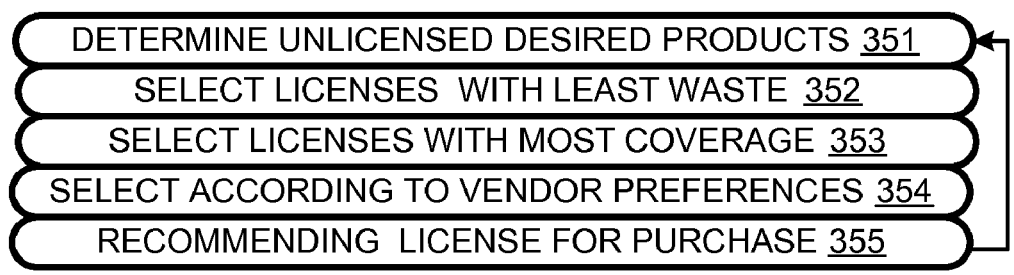
FIG. 3 is a flow chart of a portion of the process of FIG. 2.

Process segment 207 is analogous to the series of process segments 202-205, as shown in FIG. 3. The difference is that licenses are not selected from owned and available licenses, but from licenses that are available for purchases from vendors 300 (FIG. 2). Thus, a process segment 351 (FIG. 3), a determination is made of the unlicensed desired software management products for the currently selected managed system. At process segment 352, purchasable licenses with the least waste are considered. Of those, the ones with the most coverage are considered at process segment 353. At process segment 354, further criteria, e.g., vendor preferences, can be considered in further winnowing the potential purchases. At process segment 355, a most-coverage least-waste license is selected for purchase. If purchasing and applying this license would not license all desired products for the current managed system, segments 351-355 can be iterated until sufficient purchasable licenses have been selected.

Once sufficient purchasable licenses have been selected at process segment 207, they can be purchased at process segment 208 (FIG. 2), and applied at process segment 209. The newly licensed products can be applied to the current managed system at process segment 210. As can be recognized by those skilled in the art, the order and parallelism with which process segments 201-210 and their iterations are performed can be varied except as constrained by logical dependencies.

Herein, a "system" is a set of interacting elements, wherein the elements can be, by way of example and not of limitation, mechanical components, electrical elements, atoms, instructions encoded in storage media, and process segments. By "recommend" is meant presenting a selection in human readable format so that a human user can decide whether or not to act on a recommendation. In this specification, related art is discussed for expository purposes. Related art labeled "prior art", if any, is admitted prior art. Related art not labeled "prior art" is not admitted prior art. The illustrated and other described embodiments, as well as modifications thereto and variations thereupon are within the scope of the following claims.

What is claimed is:

1. A method comprising:
   a) a computer determining desired software products for a managed system;
   b) said computer selecting a least-waste set of available owned multi-product licenses, each multi-product license of said least-waste set providing coverage for at least one of said desired software product and for at least one non-desired software product, each multi-product license of said least-waste set providing least waste in terms of covering non-desired software products other than said desired software products, a first license of said least-waste set providing more coverage for said desired software products than a second license of said least-waste set;
   c) said computer selecting a most-coverage subset of licenses of said least-waste set, each license of said most-coverage subset providing a greatest coverage for said desired software products; and
   d) recommending to a user or applying a license of said most-coverage subset to said managed system.

2. A method as recited in claim 1 further comprising iterating a-d until there are no unlicensed desired software products for said managed product or there are no applicable available owned licenses.

3. A method as recited in claim 2 further comprising, when there are no applicable available owned licenses, said computer making purchase recommendations for at least one additional license.

4. A method as recited in claim 3 wherein said making of purchase recommendations involves:
   determining unlicensed desired remaining products remaining after said iterating;
   selecting, from applicable purchasable multi-product licenses, a least-waste purchasable set of purchasable multi-product licenses with the least waste in terms of covering software products other than said desired remaining products;
   selecting from said least-waste purchasable set a most-coverage purchasable subset for purchase.

5. A method as recited in claim 4 further comprising purchasing the purchasable license recommended for purchase.

6. A method as recited in claim 2 including using products to which licenses have been applied in the course of said iterations.

7. A method as recited in claim 1 wherein said applying involves selecting a license of said second set based on it meeting an additional criterion that at least one other license of said second set does not meet.

8. A method as recited in claim 1 wherein said greatest coverage is a fraction of one of said desired software products.

9. A computer system comprising:
   hardware processors, communications devices, and computer-readable storage media;
   central-management products that are licensable for managing managed computer systems while executing on a central-management server separate from said managed computer systems;
   available owned multi-product licenses each providing coverage for plural of said central-management products; and
   a license manager for selecting to be recommended for or applied to managed computer system a most-coverage least-waste multi-product license, said most-coverage least-waste multi-product license providing coverage for managing a managed system using at least one desired central-management product executing on said central-management server, said most-coverage least-waste license providing coverage for at least one non-desired central-management product that is not to be used in managing said managed computing system.

10. A computer system as recited in claim 9 wherein said available owned licenses include single-product licenses and multi-product licenses.

11. A computer system as recited in claim 9 wherein said license manager provides for iteratively selecting and then applying most-coverage least-waste licenses one license at a time until there are no unlicensed desired software products for said managed product or there are no applicable available owned licenses.

12. A computer system as recited in claim 11 wherein said license manager further provides for making purchase recommendations for licenses when there are desired software products but not applicable available owned licenses.

13. A computer system as recited in claim 12 wherein making purchase recommendations involves selecting at least one most-coverage least-waste purchasable license from a set of purchasable licenses.

14. A computer system as recited in claim 13 wherein said purchasable licenses include single-product licenses and multi-product licenses.

15. A system comprising non-transitory computer-readable storage media encoded with code providing for:
  a) selecting a least-waste set of one or more least-waste multi-product licenses of applicable available licenses so that no license of said first set covers more non-desired central-management software products that are not desired for managing said managed system than any other multi-product license of said least-waste set;
  b) selecting a most-coverage subset of one or more most-coverage licenses from said least-waste set so that no license of said most-coverage subset covers more desired central-management software products for managing a given managed system while executing on a central-management server separate from said given managed system than any member of said least-waste set not also in said most-coverage subset; and
  c) recommending to a user or applying a best-fit license of said most-coverage subset for managing said given managed system using at least one of said desired central-management software products executing on said central-management server.

16. A system as recited in claim 15 wherein said code selects said best-fit license from said most-coverage subset according to a criterion other than greatest coverage and least waste.

17. A system as recited in claim 15 wherein said code provides for iteratively selecting and then applying most-coverage least-waste licenses one license at a time until there are no unlicensed desired software products for said managed product or there are no applicable available owned licenses.

18. A system as recited in claim 17 wherein said code further provides for making purchase recommendations for licenses when there are desired software products but no applicable available owned licenses.

19. A system as recited in claim 18 wherein said making purchase recommendations involves selecting at least one most coverage least-waste purchasable license from a set of purchasable licenses.

\* \* \* \* \*

UNITED STATES PATENT AND TRADEMARK OFFICE
CERTIFICATE OF CORRECTION

PATENT NO. : 8,401,925 B1
APPLICATION NO. : 12/694181
DATED : March 19, 2013
INVENTOR(S) : Bradley A. Klein et al.

It is certified that error appears in the above-identified patent and that said Letters Patent is hereby corrected as shown below:

On the title page, item (75), Inventors, in column 1, line 3, delete "Longona," and insert -- Longoria, --, therefor.

In the Specification

In column 1, line 53, delete ""most-coverage", "least-waste"" and insert -- "most-coverage, least-waste" --, therefor.

In the Claims

In column 4, line 43, in Claim 4, delete "for purchase." and insert -- of purchasable multi-product licenses with the most coverage of said desired remaining products; and
    recommending a purchasable multi-product license of said most-coverage purchasable subset for purchase. --, therefor.

Signed and Sealed this
Twenty-seventh Day of May, 2014

Michelle K. Lee
*Deputy Director of the United States Patent and Trademark Office*